United States Patent
Citti et al.

(10) Patent No.: US 11,814,317 B2
(45) Date of Patent: Nov. 14, 2023

(54) REFRACTORY ARTICLE AND METHOD OF MAKING

(71) Applicant: SAINT-GOBAIN CERAMICS & PLASTICS, INC., Worcester, MA (US)

(72) Inventors: Olivier Citti, Wellesley, MA (US); Wesley S Towle, North Grosvenordale, CT (US); David J. Lechevalier, Cambridge, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 87 days.

(21) Appl. No.: 15/552,386

(22) PCT Filed: Feb. 24, 2016

(86) PCT No.: PCT/US2016/019322
§ 371 (c)(1),
(2) Date: Aug. 21, 2017

(87) PCT Pub. No.: WO2016/138111
PCT Pub. Date: Sep. 1, 2016

(65) Prior Publication Data
US 2018/0044243 A1 Feb. 15, 2018

Related U.S. Application Data

(60) Provisional application No. 62/120,818, filed on Feb. 25, 2015, provisional application No. 62/120,343, filed on Feb. 24, 2015.

(51) Int. Cl.
*C04B 35/66* (2006.01)
*C04B 35/185* (2006.01)
(Continued)

(52) U.S. Cl.
CPC .............. *C04B 35/185* (2013.01); *C03B 5/43* (2013.01); *C04B 35/657* (2013.01); *C04B 35/66* (2013.01);
(Continued)

(58) Field of Classification Search
None
See application file for complete search history.

(56) References Cited

U.S. PATENT DOCUMENTS

| 3,378,385 A | 4/1968 | McCreight et al. |
| 3,519,448 A | 7/1970 | Alper et al. |

(Continued)

FOREIGN PATENT DOCUMENTS

| CN | 1210838 A | 3/1999 |
| CN | 1380878 A | 11/2002 |

(Continued)

OTHER PUBLICATIONS

Bauer et al., "Emissivities of ceramic materials for high temperature processes", Aug. 18, 2005, Proc. SPIE 5880, Optical Diagnostics, 58800W (10 pages). (Year: 2005).*

(Continued)

*Primary Examiner* — Humera N. Sheikh
*Assistant Examiner* — Kim S. Horger
(74) *Attorney, Agent, or Firm* — Abel Schillinger, LLP; Robert N. Young

(57) ABSTRACT

A refractory article includes a body including a ceramic having an aluminosilicate present in an amount of at least 70 wt % and not greater than 99 wt % for a total weight of the body, and the body further includes a dopant including a Mg-containing oxide compound and a Fe-containing oxide compound, and the dopant is present in an amount within a range including at least 1 wt % and not greater than 12 wt %.

6 Claims, 2 Drawing Sheets

(51) Int. Cl.

| | |
|---|---|
| *C04B 41/87* | (2006.01) |
| *C04B 41/00* | (2006.01) |
| *C04B 41/50* | (2006.01) |
| *C04B 35/657* | (2006.01) |
| *C03B 5/43* | (2006.01) |

(52) U.S. Cl.
CPC ........ *C04B 41/009* (2013.01); *C04B 41/5037* (2013.01); *C04B 41/87* (2013.01); *C04B 2235/3217* (2013.01); *C04B 2235/3222* (2013.01); *C04B 2235/3227* (2013.01); *C04B 2235/3229* (2013.01); *C04B 2235/3232* (2013.01); *C04B 2235/3241* (2013.01); *C04B 2235/3243* (2013.01); *C04B 2235/3267* (2013.01); *C04B 2235/3272* (2013.01); *C04B 2235/3274* (2013.01); *C04B 2235/3279* (2013.01); *C04B 2235/3293* (2013.01); *C04B 2235/3418* (2013.01); *C04B 2235/3813* (2013.01); *C04B 2235/5409* (2013.01); *C04B 2235/5436* (2013.01); *C04B 2235/5445* (2013.01); *C04B 2235/72* (2013.01); *C04B 2235/77* (2013.01); *C04B 2235/80* (2013.01)

(56) References Cited

U.S. PATENT DOCUMENTS

| | | |
|---|---|---|
| 3,652,307 A | 3/1972 | Bakker |
| 3,808,013 A | 4/1974 | Manigault |
| 3,844,803 A | 10/1974 | Blanke et al. |
| 3,879,210 A | 4/1975 | LaBar |
| 3,953,563 A | 4/1976 | Kihlstedt et al. |
| 4,018,965 A | 4/1977 | Kerko et al. |
| 4,093,470 A | 6/1978 | Cherry |
| 4,117,055 A | 9/1978 | Alexanderson |
| 4,272,500 A | 6/1981 | Eggerding |
| 4,290,814 A | 9/1981 | Pavlica et al. |
| 4,595,665 A | 6/1986 | Takayama et al. |
| 4,735,926 A | 4/1988 | Ando et al. |
| 5,061,526 A | 10/1991 | Robyn et al. |
| 5,076,815 A | 12/1991 | Kunz et al. |
| 5,137,853 A | 8/1992 | Ichikawa et al. |
| 5,288,672 A | 2/1994 | Gugel et al. |
| 5,290,739 A | 3/1994 | Hickman |
| 5,322,826 A | 6/1994 | Becker et al. |
| 5,326,512 A | 7/1994 | Stillwagon et al. |
| 5,403,795 A | 4/1995 | Koyama et al. |
| 5,538,926 A | 7/1996 | Tsuchida et al. |
| 5,733,830 A | 3/1998 | Endo et al. |
| 5,795,363 A | 8/1998 | Pecoraro et al. |
| 5,830,819 A | 11/1998 | Shikata et al. |
| 5,856,254 A | 1/1999 | Feige et al. |
| 6,007,873 A | 12/1999 | Holcombe, Jr. et al. |
| 6,054,186 A | 4/2000 | Bonsall, III |
| 6,077,801 A | 6/2000 | Zanoli et al. |
| 6,117,807 A | 9/2000 | Virkar et al. |
| 6,143,678 A | 11/2000 | Yamamoto et al. |
| 6,158,248 A | 12/2000 | Beppu |
| 6,159,885 A | 12/2000 | Mizuno et al. |
| 6,362,120 B1 | 3/2002 | Fukushima |
| 6,378,598 B1 | 4/2002 | Tonelli et al. |
| 6,383,963 B1 | 5/2002 | Yamamoto et al. |
| 6,417,127 B1 | 7/2002 | Yamamoto et al. |
| 6,753,284 B2 | 6/2004 | Yamamoto et al. |
| 6,812,177 B2 | 11/2004 | Ishino |
| 7,148,167 B2 | 12/2006 | Shikata et al. |
| 7,335,617 B2 | 2/2008 | Boussant-Roux et al. |
| 7,485,594 B2 | 2/2009 | Saha |
| 7,648,732 B2 | 1/2010 | Ott et al. |
| 7,708,935 B2 | 5/2010 | Kabashima et al. |
| 7,767,292 B2 | 8/2010 | Djuricic et al. |
| 7,939,458 B2 | 5/2011 | Nakamura et al. |
| 8,067,326 B2 | 11/2011 | Godard et al. |
| 8,092,928 B2 | 1/2012 | Schofalvi et al. |
| 8,138,109 B2 | 3/2012 | Takenami et al. |
| 8,187,990 B2 | 5/2012 | Avedikian et al. |
| 8,354,202 B2 | 1/2013 | Querel |
| 9,073,773 B2 | 7/2015 | Citti et al. |
| 9,174,874 B2 | 11/2015 | Citti et al. |
| 9,249,043 B2 | 2/2016 | Citti et al. |
| 2001/0019992 A1 | 9/2001 | Gaubil et al. |
| 2002/0103070 A1 | 8/2002 | Ishino |
| 2002/0172871 A1 | 11/2002 | Schucker |
| 2003/0078156 A1 | 4/2003 | Lowden |
| 2003/0109372 A1 | 6/2003 | Hasegawa et al. |
| 2003/0110804 A1 | 6/2003 | Fenn et al. |
| 2005/0051057 A1 | 3/2005 | Evans et al. |
| 2005/0186469 A1 | 8/2005 | De Jonghe et al. |
| 2006/0172879 A1 | 8/2006 | Boussant-Roux et al. |
| 2006/0293162 A1 | 12/2006 | Ellison |
| 2007/0015655 A1 | 1/2007 | Avedikian et al. |
| 2007/0154762 A1 | 7/2007 | Schucker |
| 2007/0203013 A1 | 8/2007 | Harmuth |
| 2008/0047300 A1 | 2/2008 | Rhoads |
| 2008/0269042 A1 | 10/2008 | Carty |
| 2009/0062106 A1 | 3/2009 | Avedikian et al. |
| 2009/0131241 A1 | 5/2009 | Godard et al. |
| 2009/0162930 A1 | 6/2009 | Grimes et al. |
| 2009/0233784 A1 | 9/2009 | Schofalvi et al. |
| 2010/0159226 A1 | 1/2010 | Suchanek et al. |
| 2010/0056358 A1 | 3/2010 | Teratani et al. |
| 2010/0068492 A1 | 3/2010 | Boussant-Roux et al. |
| 2010/0084016 A1 | 4/2010 | Aitken et al. |
| 2010/0087307 A1 | 4/2010 | Murata et al. |
| 2010/0089098 A1 | 4/2010 | Citti et al. |
| 2010/0151232 A1 | 6/2010 | Cabodi et al. |
| 2010/0179051 A1 | 7/2010 | Citti et al. |
| 2010/0212359 A1 | 8/2010 | Godard et al. |
| 2010/0251774 A1 | 10/2010 | Peterson |
| 2010/0298109 A1 | 11/2010 | Takenami et al. |
| 2011/0021340 A1 | 1/2011 | Schofalvi et al. |
| 2011/0236743 A1 | 9/2011 | Kumar et al. |
| 2011/0251042 A1 | 10/2011 | Araki et al. |
| 2011/0283742 A1 | 11/2011 | Alasia |
| 2012/0006059 A1 | 1/2012 | Dejneka et al. |
| 2012/0006069 A1 | 1/2012 | Kim et al. |
| 2012/0096822 A1 | 4/2012 | Raffy |
| 2012/0164540 A1 | 6/2012 | Park et al. |
| 2012/0180528 A1 | 7/2012 | Ketcham et al. |
| 2012/0216566 A1 | 8/2012 | Ishino et al. |
| 2012/0227445 A1 | 9/2012 | Citti et al. |
| 2012/0260696 A1 | 10/2012 | Citti et al. |
| 2012/0263929 A1* | 10/2012 | Citti ............ C03B 17/064 428/212 |
| 2013/0217563 A1* | 8/2013 | Citti .................. C04B 35/111 501/96.3 |
| 2015/0274568 A1 | 10/2015 | Citti et al. |
| 2016/0340222 A1 | 11/2016 | Dejneka et al. |

FOREIGN PATENT DOCUMENTS

| | | |
|---|---|---|
| CN | 1835897 A | 9/2006 |
| CN | 1950313 A | 4/2007 |
| CN | 101094816 A | 12/2007 |
| CN | 101124173 A | 2/2008 |
| CN | 101157545 A | 4/2008 |
| CN | 101367665 A | 2/2009 |
| CN | 101687711 A | 3/2010 |
| CN | 101774749 A | 7/2010 |
| CN | 101925558 A | 12/2010 |
| DE | 3029784 A1 | 2/1981 |
| DE | 3725170 A1 | 2/1989 |
| DE | 112006003321 A5 | 10/2008 |
| EA | 013699 B1 | 6/2010 |
| EP | 0010834 A1 | 5/1980 |
| EP | 0242769 A2 | 10/1987 |
| EP | 0701979 A1 | 3/1996 |
| EP | 0818259 A1 | 1/1998 |
| EP | 0850897 A2 | 7/1998 |
| EP | 0887324 A1 | 12/1998 |
| EP | 1074529 A2 | 2/2001 |
| EP | 1288177 A1 | 3/2003 |
| EP | 1813580 A1 | 8/2007 |

(56) References Cited

FOREIGN PATENT DOCUMENTS

| | | |
|---|---|---|
| EP | 2407441 A2 | 1/2012 |
| FR | 2392946 A1 | 12/1978 |
| FR | 2859203 A1 | 3/2005 |
| GB | 454599 A | 10/1936 |
| GB | 618248 A | 2/1949 |
| GB | 960384 A | 6/1964 |
| GB | 1072536 A | 6/1967 |
| GB | 1217620 A | 12/1970 |
| GB | 1244895 A | 9/1971 |
| GB | 1531167 A | 11/1978 |
| GB | 2262522 A | 6/1993 |
| JP | S5233123 B1 | 8/1977 |
| JP | 52129714 A | 10/1977 |
| JP | S5669270 A | 6/1981 |
| JP | S5692177 A | 7/1981 |
| JP | S59146976 A | 8/1984 |
| JP | S6055459 B2 | 12/1985 |
| JP | S6265988 A | 3/1987 |
| JP | H0269363 A | 3/1990 |
| JP | H0292871 A | 4/1990 |
| JP | 2225369 A | 9/1990 |
| JP | H3083849 A | 4/1991 |
| JP | H042655 A | 1/1992 |
| JP | H04310570 A | 11/1992 |
| JP | H05148013 A | 6/1993 |
| JP | 5301762 A | 11/1993 |
| JP | H06144922 | 5/1994 |
| JP | H06144922 A | 5/1994 |
| JP | H0848561 A | 2/1996 |
| JP | H08175878 A | 7/1996 |
| JP | 9030859 A | 2/1997 |
| JP | H09100171 A | 4/1997 |
| JP | 9328357 A | 12/1997 |
| JP | H10218676 A | 8/1998 |
| JP | H11116322 A | 4/1999 |
| JP | 11171639 A | 6/1999 |
| JP | 2942061 B2 | 8/1999 |
| JP | 11343174 A | 12/1999 |
| JP | 2000111024 A | 4/2000 |
| JP | 2002128563 A | 5/2002 |
| JP | 2002241173 A | 8/2002 |
| JP | 2002316866 A | 10/2002 |
| JP | 2003081653 A | 3/2003 |
| JP | 2003137671 A | 5/2003 |
| JP | 3489588 B2 | 1/2004 |
| JP | 2004026561 A | 1/2004 |
| JP | 2004203691 A | 7/2004 |
| JP | 2004203702 A | 7/2004 |
| JP | 2004352600 A | 12/2004 |
| JP | 2005512926 A | 5/2005 |
| JP | 2006523599 A | 10/2006 |
| JP | 2007504088 A | 3/2007 |
| JP | 2007145684 A | 6/2007 |
| JP | 2007197303 A | 8/2007 |
| JP | 2008501609 A | 1/2008 |
| JP | 2009013036 A | 1/2009 |
| JP | 2009158576 A | 7/2009 |
| JP | 2009535290 A | 10/2009 |
| JP | 2011502918 A | 1/2011 |
| JP | 2011088759 A | 5/2011 |
| JP | 2011093740 A | 5/2011 |
| JP | 2011527276 A | 10/2011 |
| JP | 2012020925 A | 2/2012 |
| JP | 5390308 B2 | 1/2014 |
| KR | 20100108358 A | 10/2010 |
| RU | 2030369 C1 | 3/1995 |
| RU | 2039025 C1 | 7/1995 |
| RU | 2140961 C1 | 11/1999 |
| RU | 2154044 C2 | 8/2000 |
| RU | 2386604 C2 | 4/2010 |
| SU | 391103 A1 | 7/1973 |
| SU | 567709 A1 | 8/1977 |
| SU | 945144 A1 | 7/1982 |
| SU | 1054331 A | 11/1983 |
| SU | 1470731 A1 | 4/1989 |
| SU | 1675279 A1 | 9/1991 |
| SU | 1796601 A1 | 2/1993 |
| TW | 200616910 A | 6/2006 |
| TW | 200946467 A | 11/2009 |
| TW | I332487 B | 11/2010 |
| WO | 1999008804 A1 | 2/1999 |
| WO | 2001092183 A1 | 12/2001 |
| WO | 2004063652 A2 | 7/2004 |
| WO | 2005023726 A1 | 3/2005 |
| WO | 2006057669 A2 | 6/2006 |
| WO | 2007130298 A1 | 11/2007 |
| WO | 2009007933 A1 | 1/2009 |
| WO | 2009020011 A1 | 2/2009 |
| WO | 2009096550 A1 | 8/2009 |
| WO | 2010071892 A2 | 6/2010 |
| WO | 2010073195 A1 | 7/2010 |
| WO | 2011022639 A2 | 2/2011 |
| WO | 2011055642 A2 | 5/2011 |
| WO | 2012125507 A2 | 9/2012 |
| WO | 2012135762 A2 | 10/2012 |
| WO | 2013106609 A2 | 7/2013 |
| WO | 2016138111 A1 | 9/2016 |

OTHER PUBLICATIONS

Soong Leong Sim et al., "How do we calculate sintering temperature?", blog initiated Jan. 24, 2015, Research Gate, accessed Mar. 23, 2022 at researchgate.net/post/How-do-we-calculate-sintering-temperature-Is-there-a-review-paper-on-this (Year: 2015).*

Kleeb et al., "High Emissivity Coatings in Glass Furnaces," 74th Conference on Glass Problems, 2014, pp. 225-231.

Kleeb et al., "Fuel Savings with High Emissivity Coatings," 71st Conference on Glass Problems, 2011, pp. 125-136.

Alumina Station of Light Metal Information Network, "An Anthology of Translations of Varieties of Alumina in Foreign Countries," vol. 2, dated Jan. 31, 1982, pp. 25-26.

Dong, Weixia, "Effects of ZnO/Y2O3 on Properties of Alumina-Based Ceramics," Chinese Journal of Rare Metals, Dec. 31, 2009, pp. 865-868, vol. 33, No. 6.

Du, Haiqing, "Industrial Ceramics," Hunan University Press, Dec. 1989, p. 218.

Buban, J.P. et al., "Grain Boundary Strengthening in Alumina by Rare Earth Impurities," Science, vol. 311, No. 212, dated 2006, pp. 212-215.

International Search Report from PCT/US2012/033409 dated Mar. 4, 2013, 1 page.

Trushkova, et al., "Glass for ION-Exchange Strengthening", Plenum Publishing Company (1982), UDC 666.1.053.65, translated from Steklo I Keramika, No. 2, p. 13, dated Feb. 1982, 1 page.

"Standard Test Methods for Apparent Porosity, Water Absorption, Apparent Specific Gravity, and Bulk Density of Burned Refractory Brick and Shapes by Boiling Water", ASTM International, Designation: C20-00, Reapproved 2005, Copyright ASTM International, 3 pages.

International Search Report from PCT/US2012/031689 dated Oct. 25, 2012, 1 page.

International Search Report from PCT/US2012/028633 dated Oct. 18, 2012, 1 page.

International Search Report from PCT/US2013/021086 dated Jun. 17, 2013, 1 page.

Felsche, J., "The Alkali Problem in the Crystal Structure of Beta Alumina", Massachusetts Institute of Technology, Cambridge, Massachusetts, 7 pages.

NIST Property Data Summaries, "Beta Alumina (Al2O3)", Date Created: Feb. 8, 2001; Last Updated: Feb. 8, 2001; 2 pages <http://www.ceramics.nist.gov/srd/summary/ftgbetal.htm>.

"The Saint=Gobain SEFPRO Unshaped Product Range 1991-2009", Jan. 1, 2009, pp. 1-7, XP002731397 <www.sefpro.com/uploaded files/>.

Yujuan, Zhang, "The Effects of Ta2O5 and MgO Additives on Microstructure and Mechanical Properties of Ultra-pure Alumina Ceramics," Journal of Wuhan Institute of Building Materials, Dec. 31, 1983, Issue 1, pp. 27-42.

(56) References Cited

OTHER PUBLICATIONS

Davis, Jr., et al., "What You Should Know About Fusion-Cast Refractories", Glass Industry, Jan. 1, 1989, vol. 70, No. 9, pp. 14-16.
Wolfgang Schulle, "Feuerfeste Werkstoffe", Deutscher Verlag fur Grundstoffindustrie, Liebzig, Jan. 1, 1990, 2 pages.
G. Routschka et al., "Praxisbuch Feuerfeste Werkstoffe, 5., Auflage," Vulkan Verlag, Esse, DE, Jan. 1, 2011, 24 pages.
A.A. Litvakovsky, "Fused Cast Refractories", Moscow, Gosstroyizdat, 1959, (I), p. 30-31, Monofrax MH and Monfrax H.
"1.Bauxitg" in: Akira Nishikawa; President Plibrico Japan Co., Ltd.: "Technology of Monolithic Refractories", Jan. 1, 1984 (Jan. 1, 1984), Japan,xP002744549, Preface; pp. 60-63.
"A reference book on glass production" edited by I.I. Kitaygorodskiy, Moscow, Gosstroyizdat, 1963, vol. 2 (V), p. 457, table 206.
International Search Report for PCT/US2016/019322, dated Aug. 8, 2016, 1 page.
Wanqiu, Cui et al., "Effects of Ta2O5 and MgO Additives on Microstructure and Mechanical Properties of Ultra-Pure Alumina Ceramics," Ceramics International, vol. 14, No. 3, dated Jan. 1, 1988, pp. 133-140.

\* cited by examiner

REFRACTORY ARTICLE AND METHOD OF MAKING

CROSS-REFERENCE TO RELATED APPLICATIONS

This application is a National Stage entry under 35 U.S.C. § 371 of International Application No. PCT/US2016/019322, filed Feb. 24, 2016, entitled "REFRACTORY ARTICLE AND METHOD OF MAKING," by Olivier Citti et al., which claims priority to U.S. Provisional Patent Application No. 62/120,818, filed Feb. 25, 2015, entitled "REFRACTORY PRODUCT AND GLASS MELTING FURNACE", by Olivier Citti et al., and claims priority to U.S. Provisional Patent Application No. 62/120,343, filed Feb. 24, 2015, entitled "REFRACTORY PRODUCT AND GLASS MELTING FURNACE," by Olivier Citti et al., which all applications are assigned to the current assignee hereof and incorporated herein by reference in their entireties.

TECHNICAL FIELD

This invention relates to a sintered refractory product, which is particularly suitable for the production of glass furnace superstructures.

BACKGROUND ART

Among refractory products, there are sintered products, well known for the construction of glass-melting furnaces, and fused products. Unlike sintered products, fused products usually comprise an intergranular vitreous phase binding crystallized grains. The problems posed by sintered products and by fused products, and the technical solutions adopted to overcome them, are therefore generally different. A composition developed for fabricating a fused product is therefore not a priori usable as such for fabricating a sintered product, and vice-versa.

Sintered products are obtained by mixing appropriate raw materials then crude shaping this mixture and firing the resulting crude part at a sufficient temperature and for a sufficient time to achieve the sintering of this crude part. Sintered products, depending on their chemical composition, are designed for very varied industries.

Numerous sintered products are particularly suitable for the fabrication of glass furnaces, chiefly for the superstructure, meaning the walls under the vault not in contact with the sintered glass, and for the vault of glass furnaces.

In furnaces where the raw materials making up the glass are melted by flame burners, there is a constant need to improve energy efficiency. The present invention aims to meet this need.

SUMMARY

According to one aspect, a refractory article includes a body including a ceramic having an aluminosilicate present in an amount of at least 70 wt % and not greater than 99 wt % for a total weight of the body, and the body further includes a dopant including a Mg-containing oxide compound and a Fe-containing oxide compound, and the dopant is present in an amount within a range including at least 1 wt % and not greater than 12 wt %.

DETAILED DESCRIPTION OF THE PREFERRED EMBODIMENT(S)

Figure 1:
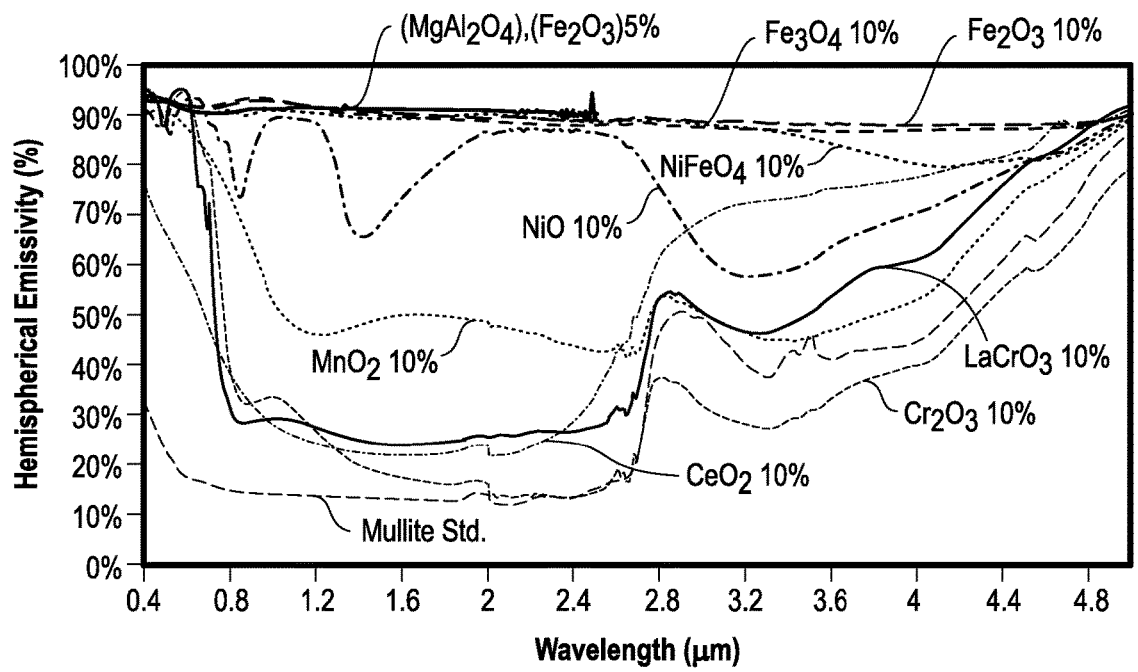
FIG. 1 includes emissivity of certain samples according to embodiments.

A product according to the embodiments herein may contain hafnium oxide, $HfO_2$, which can be naturally present in sources of zirconia. The mass content of zirconia in the article according to the embodiments can be less than or equal to 5%, generally not greater than 2%. Zirconia of $ZrO_2$ conventionally means zirconia and these traces of hafnium oxide. $HfO_2$ is therefore not included in the "other types of oxides". "Impurities" mean the unavoidable constituents, necessarily introduced with the raw materials or resulting from reactions with these constituents. These impurities are not necessarily constituents but are merely tolerated.

The "size" of a particle is the mean of its largest dimension dM and its smallest dimension dm: (dM+dm)/2. The "maximum size" of a particle corresponds to the minimum standard screen opening through which the said particle can pass. The "mean size" of a mixture of particles is the size dividing the particles of this mixture into first and second populations that are equal in number, these first and second populations containing only those particles that have a greater or smaller size respectively than the mean size.

Reference herein to "chamotte" is a mixture of grains obtained from a product that is sintered and crushed to the desired grain size. The sintered product can be specially prepared or a manufacturing reject or even a used product that can be thus recycled.

Unless stated otherwise, all of the percentages of the present description are mass percentages based on the oxides. In a sintered product according to the invention, the presence of iron, expressed in the form of $Fe_2O_3$ and/or titanium oxide, expressed in the form of $TiO_2$, in the contents according to the invention, allows, in combination with the other constituents, a refractory product to be obtained that is particularly well suited for use in the vault of a glass-melting furnace. However, at excessively high contents, the presence of these oxides may be detrimental, and thus excessive amounts of such materials may be limited.

The process for forming the articles of the embodiments herein, which may be refractory articles designed for applications in glass-melting furnaces, can include the following steps. For example, at step a), the raw materials are chosen based upon an intended final composition of the article. The raw materials are weighed, combined in the desired contents, and mixed together to form a mixture. The mixture may include binding agents, such as an organic binding agent and/or deflocculants.

Next, at step b), the mixture prepared at step a) can be poured into a mold then shaped so as to form a crude part. The mold can be shaped so that the finally-formed article assumes the form of a block having a mass of more than 5 kg, preferably more than 10 kg. Such blocks are well suited to the applications in question, notably, for use as portions of glass-melting furnaces.

Various shaping processes may be used. For example, shaping can include molding, punching, pressing (e.g., isostatic pressing, uniaxial pressing, etc.), casting (e.g., slip casting, gel casting, vibrocasting, etc.), or a combination of any of these techniques. In one embodiment, shaping results from isostatic pressing at pressures of over 100 MPa. This technique may enable a more reactive sintering, obtaining denser sintered products. The apparent porosity of the sintered products can be below 15%, such as below 10% or below 5% or below 2%, or even below 1%. The shaping process can form a green body or crude part, which will undergo further processing (e.g., sintering) before the final article is formed.

At step c) the crude part is sintered. Sintering is preferably performed at a temperature of between 1400° C. and 2500° C., in a reducing or oxidizing atmosphere. In at least one embodiment, sintering is conducted in a reducing atmosphere at atmospheric pressure.

On completing sintering, a sintered article according to the embodiments herein is formed. The sintered article may be in the form of a block, which may be a monolithic piece. Alternatively, the sintered article can be a coating on another part. In still, another embodiment, the sintered article can be a composite body. The composite body may include a core and a coating overlying the core, as described in embodiments herein. The coating can be formed after forming the crude part, but prior to sintering. Thus, the core and the coating can be co-sintered or sintered simultaneously. Still, in an alternative embodiment, the core can be formed and sintered first, and thereafter, the coating can be applied and sintered in a separate operation from the sintering of the core.

The body of the article can have various dimensions, (for example a surface layer of a thickness of less than 50 mm, less than 40 mm, less than 30 mm, for example of around 20 mm), notably a region that is exposed to the irradiation of the flames. The shape of the body is not limiting. The body may have at least one dimension (thickness, length or width) of at least 150 mm, preferably at least 200 mm, at least 400 mm, at least 600 mm, at least 800 mm or at least 1000 mm, or even yet at least 1600 mm. In one embodiment, the thickness, length and width of the body are at least 150 mm, such as at least 200 mm, or at least 300 mm, or at least 400 mm.

Preferably, the article forms part of the superstructure (vault) of a furnace, such as a glass-melting furnace. The present disclosure is not limited only to the embodiments described and provided by way of illustrative and non-limiting examples.

According to one embodiment, an article can include a body including an aluminosilicate and at least one dopant selected from the group consisting of Ni-containing compounds, Ni-containing oxide compounds, Fe-containing compounds, Fe-containing oxide compounds, Mg-containing compounds, Mg-containing oxide compounds, Mg containing and Al-containing oxide compounds, La-containing compounds, La-containing oxide compounds, Cr-containing compounds, Cr-containing oxide compounds, Mn-containing compounds, Mn-containing oxide compounds, Ce-containing compounds, Ce-containing oxide compounds, Sn-containing compounds, Sn-containing oxide compounds, Ti-containing compounds, Ti-containing oxide compounds, Zr-containing compounds, Zr-containing oxide compounds, spinel, and a combination thereof. It will be appreciated that the body can include a combination of dopant materials and is not limited to one dopant. However, there are embodiments herein that utilize only a single dopant material.

In yet another embodiment, the body can have a majority content by weight of the aluminosilicate. For example, the body can include a content of the aluminosilicate of at least about 51 wt % for a total weight of the body, such as at least 55 wt % or at least 60 wt % or at least 65 wt % or at least 70 wt % or at least 75 wt % or at least 80 wt % or at least 85 wt % or at least 88 wt % or at least 89 wt % or at least 90 wt % or at least 91 wt % or at least 92 wt % or at least 93 wt % or at least 94 wt % or at least 95 wt % or at least 96 wt % or at least 97 wt % or at least 98 wt %. Still, in at least one non-limiting embodiment, the body can include a content of the aluminosilicate of not greater than 99 wt % for a total weight of the body, such as not greater than 98 wt % or not greater than 97 wt % or not greater than 96 wt % or not greater than 95 wt % or not greater than 94 wt % or not greater than 93 wt % or not greater than 92 wt % or not greater than 91 wt % or not greater than 90 wt % or not greater than 89 wt % or not greater than 88 wt % or not greater than 87 wt % or not greater than 86 wt % or not greater than 85 wt %. It will be appreciated that the body can include a content of the aluminosilicate within a range including any of the minimum and maximum percentages noted above. It will further be appreciated that all compositions herein will have a total content of species that add up to 100%.

According to one particular embodiment, the aluminosilicate can include mullite ($3Al_2O_3 \cdot 2SiO_2$), and more particularly, the aluminosilicate may consist essentially of mullite. Materials that consist essentially of a species may include some impurities, but such impurities do not materially change the operation of the material.

In at least one embodiment, the body can include a content of the at least one dopant of at least about 1 wt % for a total weight of the body, such as at least 2 wt % at least 2.5 wt % at least 3 wt % at least 3.5 wt %, at least 4 wt %, at least 4.5 wt %, at least 5 wt %, 5.5 least 6 wt %, at least 6.5 wt %, at least 7 wt % at least 7.5 wt % at least 8 wt % at least 8.5 wt %, at least 9 wt %, at least 9.5 wt %, at least 9.8 wt %. Still, in another instance, the body can have a content of the at least one dopant of not greater than 20 wt % for a total weight of the body, such as not greater than 18 wt %, not greater than 17 wt %, not greater than 16 wt %, not greater than 15 wt %, not greater than 14 wt %, not greater than 13 wt %, not greater than 12 wt %, not greater than 11 wt %, not greater than 10 wt %, not greater than 9 wt %, not greater than 8 wt %, not greater than 7 wt %, not greater than 6 wt %, not greater than 5 wt %, not greater than 4 wt %, not greater than 3 wt %. It will be appreciated that the body can include a content of the at least one dopant within a range including any of the minimum and maximum percentages noted above.

In one embodiment, the at least one dopant can include a material selected from the group consisting of $NiFe_2O_4$, $Fe_3O_4$, $MgAl_2O_4$ and $Fe_3O_4$, $La_2O_3$, $LaCrO_3$, $Cr_2O_3$, $MnO_2$, $CeO_2$, NiO, $SnO_2$, $TiO_2$, $ZrB_2$, $(Mg, Fe)(Al, Fe)_2O_4$, and a combination thereof. More particularly, the body may have a single dopant, which may include any of the above noted dopants. Still, in another embodiment, the body may include a plurality of dopants, including any combination of the dopants noted herein.

In still another embodiment, the body can have an average relative emissivity over a range of wavelengths of 0.5 microns to 5 microns of at least 0.5, such as at least 0.6, at least 0.65, at least 0.7, at least 0.8, at least 0.83, at least 0.85, at least 0.87, at least 0.88, at least 0.89, at least 0.9. In one non-limiting embodiment, the average relative emissivity over the wavelength of 0.5 microns to 5 microns can be not greater than 0.99, such as not greater than 0.98. It will be appreciated that the average relative emissivity can be within a range including any of the minimum and maximum values noted above. Moreover, the average relative emissivity can be for a range of wavelengths in the infrared portion of the electromagnetic spectrum thus providing an indication of the efficiency of reflecting heat.

In still another embodiment, the body can have a minimum emissivity over a range of wavelengths of 0.5 microns to 5 microns of at least 0.5, wherein the minimum emissivity is defined as the lowest point along the emissivity spectrum curve over the range of wavelengths. In still another embodiment, the minimum emissivity can be at least 0.6, such as at least 0.65, at least 0.7, at least 0.8, at least 0.83, at least 0.85, at least 0.87, at least 0.88, at least 0.89, at least 0.9. In one non-limiting embodiment, the minimum emissivity over the range of wavelengths of 0.5 microns to 5 microns can be not greater than 0.99, such as not greater than 0.98. It will be appreciated that the minimum emissivity can be within a range including any of the minimum and maximum values noted above.

Reference herein to emissivity can be an emissivity value at a specific temperature, including for example, but not limited to 25° C., 100° C., 500° C., 1000° C., or 1600° C. Emissivity can be measured using two Fourier transform infrared (FTIR) spectrometers manufactured by Bruker (Vertex Vertex 80v and 70) for performing emission measurements in the spectral range of 1000-16000 $cm^{-1}$. The samples have a thickness of about 4 mm and the typical diameter of the analyzed area on the sample is 2 mm. The sample heating is provided by a CO2 laser (Diamond K500, Coherent INC.). The beam follows a path through a splitter and a set of mirrors for conducting heating of the two faces of the sample. Two radiation heat flux are simultaneously measured by both spectrometers: the flux emitted by the sample and the flux emitted by a black body. The black body is a Pyrox PY8 furnace, having a cylindrical cavity in lanthanum chromite $LaCrO_3$, pierced with a lateral orifice, and has an emissivity equal to 1. The emission of a heated sample is measured in the direction perpendicular to the surface (i.e., normal emissivity). The infrared spectrometers are also used as pyrometers for the measurement of the sample temperature. The method used is that from the point of Christiansen.

In at least one embodiment, the body can have a melting temperature of at least 1100° C. or at least 1200° C. or at least 1300° C. or at least or at least 1400° C. or at least 1500° C. or at least 1600° C. or at least 1700° C. or at least 1800° C. or at least 1900° C. or at least 2000° C. or at least 2100° C. or at least 2200° C. Still, in at least one embodiment, the melting temperature can be not greater than 3200° C. or not greater than 3000° C. or not greater than 2900° C. or even not greater than 2800° C. It will be appreciated that the body can have a melting temperature within a range including any of the minimum and maximum values noted above.

The body may be particularly useful as a refractory article, such as a portion of a glass furnace. In at least one embodiment, the body can be a refractory article used as part of a glass furnace superstructure.

The body can be formed to have a particular theoretical density to facilitate suitable performance, including but not limited to a theoretical density of at least 50% or at least 60% or at least 70% or at least 80% or at least 90% or at least 95% or at least 97% or at least 99%. In one embodiment, the theoretical density can be not greater than 99%, such as not greater than 98%, not greater than 97%, not greater than 95%, not greater than 90% or even not greater than 88%. It will be appreciated that the body can have a theoretical density within a range including any of the minimum and maximum values noted above.

In certain instances, the body may be essentially free of certain elements or species containing such elements. For example, the body may be essentially free of Sn, La, Cr, Mn, Ni, Zr, B, Ce, Ti, oxide compounds thereof, zircon, and a combination thereof. Reference herein to contents of materials in the body that are essentially free include not greater than trace amounts of materials or contents of the materials that are present in impurity contents, such as less than 1 wt %, less than 0.5 wt %, less than 0.1 wt % or even less than 0.01 wt %.

In another embodiment, the body can be essentially free of carbides, nitrides, borides, and a combination thereof. Moreover, it will be appreciated that in at least one instance, the body can consist essentially of oxides and/or oxide-containing compounds.

The body may include a combination of distinct phases including polycrystalline, monocrystalline and/or amorphous phases. For example, the body can include a phase of the aluminosilicate material and a phase including the dopant material. Still, in certain instances one or more phases may exist in the body including a combination of the aluminosilicate and at least one dopant. Such phases having a combination of the aluminosilicate and at least one dopant may be a solid solution of one or more of the elements contained in the compounds. Still, in other instances, a phase including the aluminosilicate and at least one dopant may form a completely distinct composition and discrete phase.

In one embodiment, the body can include a phase including alumina that can be distinct from a phase comprising the aluminosilicate. According to one embodiment, the body can have a content of a phase including alumina that is less than a content of a phase comprising the aluminosilicate.

Moreover, in yet another embodiment, the body may include a phase of silica distinct from a phase comprising the aluminosilicate. In such instances, the body may have a content of silica less than a content of a phase comprising the aluminosilicate.

In one particular embodiment, the body can have at least one dopant including a combination of a Mg-containing compound and a Fe-containing compound present in an amount within a range including at least 1 wt % and not greater than 12 wt % for a total weight of the body. At least one part of the dopant can include a spinel material, which can have a spinel structure of $MX_2O_4$, wherein M and X are cation elements, and more particularly may be selected from the group of Ni, Al, Sn, Mg, Fe, and a combination thereof. The spinel can have an octahedral or cubic crystalline structure. More particularly, the dopant including the Mg-containing compound and a Fe-containing compound can be present in an amount within a range including at least 1 wt % and not greater than 10 wt % for a total weight of the body, such as within a range including at least 2 wt % and not greater than 8 wt % for a total weight of the body, or even within a range including at least 3 wt % and not greater than 6 wt % for a total weight of the body.

In yet another embodiment, the body can include a dopant that can include a mixture or compound including a spinel compound and Fe-containing oxide compound. In such instances, the dopant can be a mixture including a molar ratio of the compounds (spinel compound:Fe-containing oxide compound) of at least 0.1:1, such as at least 0.2:1, at least 0.3:1, at least 0.4:1, at least 0.5:1, at least 0.6:1, at least 0.7:1, at least 0.8:1, or even at least 0.9:1. Still, in a non-limiting embodiment, the mixture can have a molar ratio (spinel compound:Fe-containing oxide compound) of not greater than 9:1, not greater than 8:1, not greater than 7:1, not greater than 6:1, not greater than 5:1, not greater than 4:1, not greater than 3:1, or even not greater than 2:1. It will be appreciated that the foregoing molar ratio can be within a range including any of the minimum and maximum ratios noted above. In a particular embodiment, the mixture can include a molar ratio (spinel compound:Fe-containing oxide compound) of approximately 1:1.

For another embodiment including a dopant that is a mixture of the spinel compound and Fe-containing oxide compound, the mixture can define a molar ratio (Fe-containing oxide compound:spinel compound) of at least 0.1:1, such as at least 0.2:1, at least 0.3:1, at least 0.4:1, at least 0.5:1, at least 0.6:1, at least 0.7:1, at least 0.8:1 or at least 0.9:1. Still, in certain instances, the molar ratio (Fe-containing oxide compound:spinel compound) can be not greater than 9:1, such as not greater than 8:1, not greater than 7:1, not greater than 6:1, not greater than 5:1, not greater than 4:1, not greater than 3:1, not greater than 2:1. It will be appreciated that the foregoing molar ratio can be within a range including any of the minimum and maximum ratios noted above. In one embodiment, the mixture can include a molar ratio (Fe-containing oxide compound:spinel compound) of approximately 1:1.

Reference herein to an article comprising certain components (e.g., aluminosilicate and dopant(s)) is reference to an article that is formed from any of the components in any of the contents as disclosed in the embodiments herein. For example, the articles of the embodiments herein can be formed from an aluminosilicate and at least one dopant selected from the group consisting of Ni-containing compounds, Ni-containing oxide compounds, Fe-containing compounds, Fe-containing oxide compounds, Mg-containing compounds, Mg-containing oxide compounds, Mg containing and Al-containing oxide compounds, La-containing compounds, La-containing oxide compounds, Cr-containing compounds, Cr-containing oxide compounds, Mn-containing compounds, Mn-containing oxide compounds, Ce-containing compounds, Ce-containing oxide compounds, Sn-containing compounds, Sn-containing oxide compounds, Ti-containing compounds, Ti-containing oxide compounds, Zr-containing compounds, Zr-containing oxide compounds, spinel, and a combination thereof. It will also be appreciated that the article can be formed from the noted contents of the components as described in the embodiments herein, such that the initial mixture used to form the article can include those contents of components noted as being present in the article.

In certain instances, the body may be in the form of a composite body having a coating overlying a core. That is, embodiments herein also include composite materials that can include a body or core and a coating overlying at least a portion of the body. The coating can overly at least a majority of the core, such as at least 60%, at least 80%, or even the entire exterior surface area of the core. Moreover, the coating can be of sufficient thickness to withstand certain mechanical forces to limit or eliminate damage to the core. The coating may also be sufficiently robust to substantially eliminate corrosion of the core due to exposure to corrosive chemical species.

The core underlying the coating can include any material, including but not limited to, an inorganic material, an organic material, a metal, a metal alloy, a cermet, a ceramic, glass, polycrystalline material, monocrystalline material, and a combination thereof. The core may include an oxide, carbide, nitride, boride, and a combination thereof. The core can consist essentially of any of the foregoing materials. Still, the core can include any of the materials noted in the embodiments herein, including for example, an aluminosilicate material including at least one dopant.

Notably, the coating can have any of the attributes of a body including the compositions noted herein, such as an aluminosilicate and at least one dopant as referenced in the embodiments herein. For example, the coating can include a material including an aluminosilicate and at least one dopant selected from the group consisting of Ni-containing compounds, Ni-containing oxide compounds, Fe-containing compounds, Fe-containing oxide compounds, Mg-containing compounds, Mg-containing oxide compounds, Mg containing and Al-containing oxide compounds, La-containing compounds, La-containing oxide compounds, Cr-containing compounds, Cr-containing oxide compounds, Mn-containing compounds, Mn-containing oxide compounds, Ce-containing compounds, Ce-containing oxide compounds, Sn-containing compounds, Sn-containing oxide compounds, Ti-containing compounds, Ti-containing oxide compounds, Zr-containing compounds, Zr-containing oxide compounds, spinel, or any combination thereof.

In one embodiment, the coating can include a majority content by weight of the aluminosilicate. The coating can have a content of the aluminosilicate of at least about 51 wt % for a total weight of the body, such as at least 55 wt % at least 60 wt % at least 65 wt % at least 70 wt %, at least 75 wt %, at least 80 wt %, at least 85 wt %, at least 88 wt %, at least 89 wt %, at least 90 wt % at least 91 wt % at least 92 wt % at least 93 wt %, at least 94 wt %, at least 95 wt %, at least 96 wt %, at least 97 wt %, at least 98 wt %. Still, in at least one embodiment, the coating can have a content of the aluminosilicate of not greater than 99 wt % for a total weight of the body, not greater than 98 wt %, not greater than 97 wt %, not greater than 96 wt %, not greater than 95 wt %, not greater than 94 wt %, not greater than 93 wt %, not greater than 92 wt %, not greater than 91 wt %, not greater than 90 wt %, not greater than 89 wt %, not greater than 88 wt %, not greater than 87 wt %, not greater than 86 wt %, not greater than 85 wt %. It will be appreciated that the coating can include a content of the aluminosilicate within a range including any of the minimum and maximum percentages noted above.

The coating can comprise an aluminosilicate including mullite ($3Al_2O_3$ $2SiO_2$), and more particularly, the aluminosilicate can consist essentially of mullite.

In at least one embodiment, the coating can include a content of the at least one dopant of at least about 1 wt % for a total weight of the coating, such as at least 2 wt % at least 2.5 wt % at least 3 wt % at least 3.5 wt %, at least 4 wt %, at least 4.5 wt %, at least 5 wt %, 5.5 least 6 wt %, at least 6.5 wt %, at least 7 wt % at least 7.5 wt % at least 8 wt % at least 8.5 wt %, at least 9 wt %, at least 9.5 wt %, at least 9.8 wt %. Still, in another instance, the coating can have a content of the at least one dopant of not greater than 20 wt % for a total weight of the coating, such as not greater than 18 wt %, not greater than 17 wt %, not greater than 16 wt %, not greater than 15 wt %, not greater than 14 wt %, not greater than 13 wt %, not greater than 12 wt %, not greater than 11 wt %, not greater than 10 wt %, not greater than 9 wt %, not greater than 8 wt %, not greater than 7 wt %, not greater than 6 wt %, not greater than 5 wt %, not greater than 4 wt %, not greater than 3 wt %. It will be appreciated that the body can include a content of the aluminosilicate within a range including any of the minimum and maximum percentages noted above.

In one embodiment, the at least one dopant can include a material selected from the group consisting of $NiFe_2O_4$, $Fe_3O_4$, $MgAl_2O_4$ and $Fe_3O_4$, $La_2O_3$, $LaCrO_3$, $Cr_2O_3$, $MnO_2$, $CeO_2$, NiO, $SnO_2$, $TiO_2$, $ZrB_2$, (Mg, Fe)(Al, Fe)$_2O_4$, or any combination thereof. The coating can include a single dopant from any of the dopants noted herein. Still, the coating can include a plurality of dopants.

In still another embodiment, the coating can have an average relative emissivity over a wavelength of 0.5 microns to 5 microns of at least 0.5, at least 0.6, at least 0.65, at least 0.7, at least 0.8, at least 0.83, at least 0.85, at least 0.87, at least 0.88, at least 0.89, at least 0.9. In one non-limiting embodiment, the average relative emissivity over the wavelength of 0.5 microns to 5 microns can be not greater than 0.99, such as not greater than 0.98. It will be appreciated that the average relative emissivity can be within a range including any of the minimum and maximum values noted above. Moreover, the average relative emissivity can be for a range of wavelengths in the infrared portion of the electromagnetic spectrum thus providing an indication of the efficiency of reflecting heat. The coating can have a minimum emissivity as described in embodiments herein.

In at least one embodiment, the coating can have a melting temperature of at least 1100° C. or at least 1200° C. or at least 1300° C. or at least or at least 1400° C. or at least 1500° C. or at least 1600° C. or at least 1700° C. or at least 1800° C. or at least 1900° C. or at least 2000° C. or at least 2100° C. or at least 2200° C. Still, in at least one embodiment, the melting temperature can be not greater than 3200° C. or not greater than 3000° C. or not greater than 2900° C. or even not greater than 2800° C. It will be appreciated that the coating can have a melting temperature within a range including any of the minimum and maximum values noted above.

The coating may be particularly useful as a refractory article, such as a portion of a glass furnace. In at least one embodiment, the coating can be part of a refractory article used as part of a glass furnace superstructure. Moreover, the entire composite, including the body and the coating overlying the body can be a refractory article, which may be used as part of a glass furnace, and more particularly, part of the superstructure of the glass furnace.

The coating can be formed to have a particular theoretical density to facilitate suitable performance, including but not limited to a theoretical density of at least 50% or at least 60% or at least 70% or at least 80% or at least 90% or at least 95% or at least 97% or at least 99%. In one embodiment, the theoretical density can be not greater than 99%, such as not greater than 98%, not greater than 97%, not greater than 95%, not greater than 90% or even not greater than 88%. It will be appreciated that the coating can have a theoretical density within a range including any of the minimum and maximum values noted above.

In certain instances, the coating may be essentially free of Sn, La, Cr, Mn, Ni, Zr, B, Ce, Ti, oxide compounds thereof, zircon, and a combination thereof. Reference herein to contents of materials in the coating that are essentially free include not greater than trace amounts of materials or contents of the materials that are present in impurity contents, such as less than 1 wt %, less than 0.5 wt %, less than 0.1 wt % or even less than 0.01 wt %. For example, in at least one instance, the coating can be essentially free of carbides, nitrides, borides, and a combination thereof. Moreover, it will be appreciated that in at least one instance, the coating can consist essentially of oxides and oxide compounds.

The coating may include a combination of distinct phases including polycrystalline, monocrystalline and/or amorphous phases. For example, the coating can include a phase of the aluminosilicate material and a phase including the dopant material. Still, in certain instances one or more phases may exist in the coating including a combination of the aluminosilicate and at least one dopant. Such phases having a combination of the aluminosilicate and at least one dopant may be a solid solution of one or more of the elements contained in the compounds. Still, in other instances, a phase including the aluminosilicate and at least one dopant may form a completely distinct composition and discrete phase.

In one embodiment, the coating can include a phase including alumina that can be distinct from a phase comprising the aluminosilicate. According to one embodiment, the coating can have a content of a phase including alumina that is less than a content of a phase comprising the aluminosilicate.

Moreover, in yet another embodiment, the coating may include a phase of silica distinct from a phase comprising the aluminosilicate. In such instances, the coating may have a content of silica less than a content of a phase comprising the aluminosilicate.

The embodiments herein may further include a method of making an article comprising forming a mixture including an aluminosilicate and at least one dopant selected from the group consisting of Ni-containing compounds, Ni-containing oxide compounds, Fe-containing compounds, Fe-containing oxide compounds, Mg-containing compounds, Mg-containing oxide compounds, Mg containing and Al-containing oxide compounds, La-containing compounds, La-containing oxide compounds, Cr-containing compounds, Cr-containing oxide compounds, Mn-containing compounds, Mn-containing oxide compounds, Ce-containing compounds, Ce-containing oxide compounds, Sn-containing compounds, Sn-containing oxide compounds, Ti-containing compounds, Ti-containing oxide compounds, Zr-containing compounds, Zr-containing oxide compounds, spinel, and a combination thereof and sintering the mixture at temperature within a range including at least 1200° C. and not greater than 2800° C.

In at least one embodiment, forming can include a process selected from the group consisting of pressing, mixing, molding, casting, punching, printing, depositing, drying, coating, and a combination thereof.

As noted, the embodiments herein can also include a refractory article having a body including a ceramic comprising an aluminosilicate and a dopant. The refractory article can have any of the attributes of the embodiments herein. In one particular instance, the refractory article can include a body including a ceramic comprising an aluminosilicate present in an amount of at least 70 wt % and not greater than 99 wt % for a total weight of the body and a dopant comprising a Mg-containing oxide compound and a Fe-containing oxide compound, which can present in an amount within a range including at least 1 wt % and not greater than 12 wt %.

As will be appreciated, the ceramic can be in the form of a monolithic body including the aluminosilicate and dopant material substantially uniformly distributed throughout the entire volume of the body. In another instance, the body can be a composite including a core and a coating overlying the core, wherein the coating can include the ceramic material. The core or body underlying the coating can also include any of the materials of the embodiments herein. In at least one embodiment, the core and the coating can include at least one element that is the same between the composition of the core and the composition of the coating. For another embodiment, the core and coating can include at least one compound that is the same with respect to each of the respective compositions. For example, according to one embodiment, the core and the coating can each include an aluminosilicate material. In another embodiment, the core and the coating can each include a majority content of one or more of the same oxide compounds. For one embodiment, the core and the coating can each include mullite. For yet another embodiment, the core can consists essentially of one or more oxide compounds and the coating can consist essentially of one or more oxide compounds. For example, the core can consist essentially of mullite. The core and the coating can be bonded directly to each other, without any intervening layers. More particularly, the core and coating can be co-sintered, such that the components are sinter-bonded.

In at least one embodiment, the article can be a refractory article having a body including any of the features of the embodiments herein. For example, the body of the refractory article can include an aluminosilicate that may include mullite. More particularly, the aluminosilicate material can consist essentially of mullite.

According to another embodiment, the body of the refractory article can include a first phase comprising the aluminosilicate material. The body may include a particular content of the first phase, such as at least 1 wt % of the first phase for the total weight of the body, or even at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or even at least 95 wt %. For at least one embodiment, the body can include a majority content of the first phase. In at least one non-limiting embodiment, the body can include not greater than 99.8 wt % of the first phase for the total weight of the body, such as not greater than 99 wt %, not greater than 98.5 wt %, not greater than 98 wt %, not greater than 97 wt %, not greater than 96 wt % not greater than 95 wt %, not greater than 94 wt %, not greater than 93 wt %, not greater than 92 wt % not greater than 91 wt %, not greater than 90 wt %, not greater than 89 wt %, not greater than 88 wt % not greater than 87 wt %, not greater than 86 wt %, not greater than 85 wt %, not greater than 84 wt % not greater than 83 wt %, not greater than 82 wt %, not greater than 81 wt %, not greater than 80 wt % not greater than 75 wt %, not greater than 70 wt %, not greater than 65 wt %, not greater than 60 wt % not greater than 55 wt %. It will be appreciated that the body can have an amount of the first phase within a range including any of the minimum and maximum percentages noted above.

The first phase may include a particular material, such as mullite. In one embodiment, the first phase can include at least 10% mullite, such as at least 20% mullite, at least 30% mullite, at least 40% mullite, at least 50% mullite, at least 60% mullite, at least 70% mullite, at least 80% mullite, at least 90% mullite, at least 95% mullite, or even at least 98% mullite. According to a particular embodiment, the first phase can consist essentially of mullite.

The first phase may have at least one species of the dopant, and more than one species of one or more dopants in the body. For example, the first phase can include at least one compound including at least one element of the dopant. In certain instances, the first phase can include an oxide compound including at least one element of the aluminosilicate and at least one element of the dopant. In yet another embodiment, the first phase can include a compound including at least one cation element of the aluminosilicate and at least one cation element of the dopant.

In more particular instances, the first phase may include a solid solution. For at least one embodiment, the first phase can include a solid solution of the aluminosilicate, and more particularly mullite, and at least one species of the dopant. For an embodiment, the first phase can include a solid solution of the aluminosilicate material, such as mullite, and a first compound including at least one species of the dopant. The first compound may include an oxide.

The first phase may comprise the majority of the body, but that need not necessarily always be the case for all embodiments herein. The first phase may form a substantially continuous phase extending throughout the entire volume of the body.

The body may include other phases that are distinct from the first phase. For example, the body can include a second phase distinct from the first phase. In at least one embodiment, the body can include a greater content of the first phase (Cp1) as compared to the content of the second phase (Cp2), as measured in weight percent or volume percent. According to one embodiment, the body can define a ratio of the content of the first phase relative to the second phase as the ratio (Cp1:Cp2), which may have a value of at least 1.1:1 or at least 1.2:1 or at least 1.3:1 or at least 1.4:1 or at least 1.5:1 or at least 1.6:1 or at least 1.7:1 or at least 1.8:1 or at least 1.9:1 or at least 2:1, at least 3:1, at least 4:1, at least 5:1, at least 6:1, at least 7:1, at least 8:1, at least 9:1, at least 10:1. Still, in one non-limiting embodiment, the body can have a ratio (Cp1:Cp2) of not greater than 100:1, such as not greater than 90:1 or not greater than 80:1 or not greater than 70:1 or not greater than 60:1 or not greater than 60:1 or not greater than 50:1 or not greater than 40:1 or not greater than 30:1 or not greater than 20:1 or not greater than 10:1 or not greater than 8:1 or not greater than 6:1 or not greater than 5:1 or not greater than 4:1 or not greater than 3:1 or not greater than 2.5:1. It will be appreciated that the body can have a ratio (Cp1:Cp2) within a range including any of the minimum and maximum ratios noted above.

According to a particular embodiment, the second phase may be essentially free of the aluminosilicate material, and more particularly, can be essentially free of mullite. The second phase can have at least one species of the at a t one dopant, such as at least one element from the one or more dopants. In certain instances, the second phase can include at least one compound including at least one element of the one or more dopants. In particular instances, the second phase can include an oxide compound having at least one element of the aluminosilicate and at least one element of the dopant. More particularly, the second phase may include a compound including at least one cation element of the aluminosilicate and at least one cation element of the dopant.

The body may include a particular content of the second phase, such as at least 1 wt % of the second phase for the total weight of the body, or even at least 2 wt %, at least 3 wt %, at least 4 wt %, at least 5 wt %, at least 6 wt %, at least 7 wt %, at least 8 wt %, at least 9 wt %, at least 10 wt %, at least 11 wt %, at least 12 wt %, at least 13 wt %, at least 14 wt %, at least 15 wt %, at least 16 wt %, at least 17 wt %, at least 18 wt %, at least 19 wt %, at least 20 wt %, at least 21 wt %, at least 25 wt %, at least 30 wt %, at least 35 wt %, at least 40 wt %, at least 45 wt %, at least 50 wt %, or even at least 55 wt %. Still, in at least one non-limiting embodiment, the body may include not greater than 60 wt % of the second phase for the total weight of the body, such as not greater than 55 wt %, not greater than 50 wt %, not greater than 45 wt %, not greater than 40 wt %, not greater than 35 wt %, not greater than 30 wt %, not greater than 25 wt %, not greater than 20 wt %, not greater than 19 wt %, not greater than 18 wt %, not greater than 17 wt %, not greater than 16 wt %, not greater than 15 wt %, not greater than 14 wt %, not greater than 13 wt %, not greater than 12 wt %, not greater than 11 wt %, not greater than 10 wt %, not greater than 9 wt %, not greater than 8 wt %, not greater than 7 wt %, not greater than 6 wt %, not greater than 5 wt %, not greater than 4 wt %, not greater than 3 wt %, or even not greater than 2 wt %. It will be appreciated that the body can have a content of the second phase within a range including any of the minimum and maximum percentages noted above. In at least one embodiment, the body may include a minority content of the second phase.

According to one particular embodiment, the refractory article can have body including the dopant, which can include a combination of a Mg-containing oxide compound and a Fe-containing oxide compound present in an amount within a range including at least 1 wt % and not greater than 10 wt % for a total weight of the body. More particularly, the dopant can be present in an amount within a range including at least 2 wt % and not greater than 8 wt % for a total weight of the body, such as at least 3 wt % and not greater than 6 wt % for a total weight of the body. In one particular instance, the dopant can include (Mg, Fe)(Al, Fe)$_2$O$_4$, and may consist essentially of (Mg, Fe)(Al, Fe)$_2$O$_4$.

In certain instances, the article can have a body including a content of the aluminosilicate of at least about 51 wt % for a total weight of the body, such as at least 55 wt % at least 60 wt % at least 65 wt % at least 70 wt %, at least 75 wt %, at least 80 wt %, at least 85 wt %, at least 88 wt %, at least 89 wt %, at least 90 wt % at least 91 wt % at least 92 wt % at least 93 wt %, at least 94 wt %, at least 95 wt %, at least 96 wt %, at least 97 wt %, or even at least 98 wt %. Still, in at least one non-limiting embodiment, the article can have a body including a content of the aluminosilicate of not greater than 99 wt % for a total weight of the body, such as not greater than 98 wt %, not greater than 97 wt %, not greater than 96 wt %, not greater than 95 wt %, not greater than 94 wt %, not greater than 93 wt %, not greater than 92 wt %, not greater than 91 wt %, not greater than 90 wt %, not greater than 89 wt %, not greater than 88 wt %, not greater than 87 wt %, not greater than 86 wt %, or even not greater than 85 wt %. It will be appreciated that the body can have a content of aluminosilicate within a range including any of the minimum and maximum ratios noted above.

In yet another embodiment, the a body can have a particular content of dopant, which may include the total content of dopants (i.e., a content of a single dopant or the sum of more than one dopant). The body can include a content of the dopant of at least about 1 wt % for a total weight of the body, such as at least 2 wt % at least 2.5 wt % at least 3 wt % at least 3.5 wt %, at least 4 wt %, at least 4.5 wt %, at least 5 wt %, 5.5 least 6 wt %, at least 6.5 wt %, at least 7 wt % at least 7.5 wt % at least 8 wt % at least 8.5 wt %, at least 9 wt %, at least 9.5 wt %, at least 9.8 wt %. Still, in at least one non-limiting embodiment, the content of the dopant can be not greater than 20 wt % for a total weight of the body, such as not greater than 18 wt %, not greater than 17 wt %, not greater than 16 wt %, not greater than 15 wt %, not greater than 14 wt %, not greater than 13 wt %, not greater than 12 wt %, not greater than 11 wt %, not greater than 10 wt %, not greater than 9 wt %, not greater than 8 wt %, not greater than 7 wt %, not greater than 6 wt %, not greater than 5 wt %, not greater than 4 wt %, not greater than 3 wt %.

For at least one non-limiting embodiment, the body of the refractory article may consist essentially of oxides. The body of the refractory article may include a phase of alumina distinct from a phase comprising the aluminosilicate, such as the first phase and or second phase as provided in the embodiments herein. In at least one embodiment, the body may include a third phase distinct from the first phase and/or second phase, which may include alumina, and more particularly, can consist essentially of alumina. The content of the third phase can be the same as the contents given for the second phase according to embodiments herein. In at least one embodiment, the body comprises a content of alumina less than a content of a phase comprising the aluminosilicate. Moreover, the body of the refractory article may include a content of alumina less than a content of the second phase. Still, the body may include a content of alumina greater than a content of the second phase.

The body may also include a phase of material including silica, and more particularly, a fourth phase consisting essentially of silica. The fourth phase can be distinct from the first phase, second phase, and third phase. The presence of the fourth phase does not require the presence of a second phase or a third phase. The presence of a third phase does not require the presence of a second phase or fourth phase. The content of the fourth phase within the body can be the same as the contents given for the second phase according to embodiments herein. In at least one embodiment, the body comprises a content of silica that can be less than a content of a phase (e.g., a first phase) comprising the aluminosilicate. Moreover, the body of the refractory article may include a content of silica less than a content of the second phase. Still, the body may include a content of silica greater than a content of the second phase. Additionally, the body of the refractory article may include a content of silica less than a content of the third phase. In another embodiment, the body may include a content of silica greater than a content of the third phase.

One or more embodiments herein may demonstrate remarkable combination of average relative emissivity for a particular range of wavelengths of radiation combined with melting temperature to be particularly suited for use as refractory objects. In particular, it is noted that utilization of a body comprising primarily an aluminosilicate material (e.g., mullite) in combination with a dopant of a spinel of NiFe$_2$O$_4$, or a dopant of a spinel of MgAl$_2$O$_4$ and Fe$_3$O$_4$ in a 50/50 mol ratio provided remarkable results. Notably, the content of such dopants may be within a range between 2 wt % and 12 wt % for a total weight of the body.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A refractory article comprising:
a body including a ceramic comprising:
an aluminosilicate present in an amount of at least 70 wt % and not greater than 99 wt % for a total weight of the body; and
a dopant comprising a Mg-containing oxide compound and a Fe-containing oxide compound, present in an amount within a range including at least 1 wt % and not greater than 12 wt %.

Embodiment 2. The refractory article of embodiment 1, wherein the ceramic is in the form of a monolithic body including the aluminso silicate and dopant.

Embodiment 3. The refractory article of embodiment 1, wherein the body is a composite including a core and the ceramic as a coating overlying the core.

Embodiment 4. The refractory article of embodiment 3, wherein the core and the coating can include at least one element that is the same.

Embodiment 5. The refractory article of embodiment 3, wherein the core and coating can include at least one compound that is the same.

Embodiment 6. The refractory article of embodiment 5, wherein the core and the coating can include an aluminosilicate.

Embodiment 7. The refractory article of embodiment 3, wherein the core and the coating can both include a majority content of one or more of the same oxide compounds.

Embodiment 8. The refractory article of embodiment 7, wherein the core and the coating can include mullite.

Embodiment 9. The refractory article of embodiment 3, wherein the core consists essentially of an oxide.

Embodiment 10. The refractory article of embodiment 3, wherein the core consists essentially of mullite.

Embodiment 11. The refractory article of embodiment 1, wherein the aluminosilicate comprises mullite.

Embodiment 12. The refractory article of embodiment 1, wherein the aluminosilicate consists essentially of mullite.

Embodiment 13. The refractory article of embodiment 1, wherein the body includes a first phase comprising the aluminosilicate.

Embodiment 14. The refractory article of embodiment 13, wherein the body includes a majority content of the first phase.

Embodiment 15. The refractory article of embodiment 13, wherein the first phase comprises mullite.

Embodiment 16. The refractory article of embodiment 13, wherein the first phase comprises at least 10% mullite.

Embodiment 17. The refractory article of embodiment 13, wherein the first phase consists essentially of mullite.

Embodiment 18. The refractory article of embodiment 13, wherein the first phase comprises at least one species of the dopant.

Embodiment 19. The refractory article of embodiment 13, wherein the first phase comprises at least one compound including at least one element of the dopant.

Embodiment 20. The refractory article of embodiment 13, wherein the first phase includes an oxide compound including at least one element of the aluminosilicate and at least one element of the dopant.

Embodiment 21. The refractory article of embodiment 13, wherein the first phase includes a compound including at least one cation element of the aluminosilicate and at least one cation element of the dopant.

Embodiment 22. The refractory article of embodiment 13, wherein the first phase includes a solid solution of the mullite and at least one species of the dopant.

Embodiment 23. The refractory article of embodiment 13, wherein the first phase includes a solid solution of the mullite and a first compound including at least one species of the dopant.

Embodiment 24. The refractory article of embodiment 23, wherein the first compound includes an oxide.

Embodiment 25. The refractory article of embodiment 13, wherein the body includes a second phase distinct from the first phase.

Embodiment 26. The refractory article of embodiment 25, wherein the body includes a greater content of the first phase (Cp1) as compared to the content of the second phase (Cp2).

Embodiment 27. The refractory article of embodiment 26, wherein the body includes a ratio (Cp1:Cp2) of at least 1.5:1 and not greater than 5:1.

Embodiment 28. The refractory article of embodiment 25, wherein the second phase is essentially free of mullite.

Embodiment 29. The refractory article of embodiment 25, wherein the second phase comprises at least one species of the dopant.

Embodiment 30. The refractory article of embodiment 25, wherein the second phase comprises at least one compound including at least one element of the dopant.

Embodiment 31. The refractory article of embodiment 25, wherein the second phase includes an oxide compound including at least one element of the aluminosilicate and at least one element of the dopant.

Embodiment 32. The refractory article of embodiment 25, wherein the second phase includes a compound including at least one cation element of the aluminosilicate and at least one cation element of the dopant.

Embodiment 33. The refractory article of embodiment 25, wherein the body includes at least 1 wt % and not greater than 60 wt % of the second phase for the total weight of the body.

Embodiment 34. The refractory article of embodiment 25, wherein the body includes a minority content of the second phase.

Embodiment 35. The refractory article of embodiment 25, wherein the dopant includes a combination of a Mg-containing oxide compound and a Fe-containing oxide compound present in an amount within a range including at least 1 wt % and not greater than 10 wt % for a total weight of the body.

Embodiment 36. The refractory article of embodiment 35, wherein the dopant is present in an amount within a range including at least 3 wt % and not greater than 6 wt % for a total weight of the body.

Embodiment 37. The refractory article of embodiment 1, wherein the body comprises a content of the aluminosilicate of at least about 51 wt % and not greater than 99 wt % for a total weight of the body.

Embodiment 38. The refractory article of embodiment 25, wherein the dopant comprises $(Mg, Fe)(Al, Fe)_2O_4$.

Embodiment 39. The refractory article of embodiment 25, wherein the body comprises an average relative emissivity over a wavelength of 0.5 microns to 5 microns of at least 0.8.

Embodiment 40. The refractory article of embodiment 25, wherein the body comprises a melting temperature of at least 1600° C.

Embodiment 41. The refractory article of embodiment 25, wherein the body is part of a glass furnace.

Embodiment 42. The refractory article of embodiment 25, wherein the body is essentially free of Sn, La, Cr, Mn, Ni, Zr, B, Ce, Ti, oxide compounds thereof, zircon, and a combination thereof.

Embodiment 43. The refractory article of embodiment 25, wherein the body is essentially free of carbides, nitrides, borides, and a combination thereof.

Embodiment 44. The refractory article of embodiment 25, wherein the body consists essentially of oxides.

Embodiment 45. The refractory article of embodiment 25, wherein the body comprises a phase of alumina distinct from a phase comprising the aluminosilicate, and wherein the body comprises a content of alumina less than a content of a phase comprising the aluminosilicate, and wherein the body comprises a phase of silica distinct from a phase comprising the aluminosilicate, and wherein the body comprises a content of silica less than a content of a phase comprising the aluminosilicate.

EXAMPLES

Example 1

Twenty samples were formed to create various refractory articles having bodies made of mullite and including a dopant as outlined in the Table 1 below. Each of the samples were by creating a mixture including the desired amount of the dopant (i.e., Fraction X) with electrofused mullite, approximately 15 wt % alumina (d50 of approximately 5 microns), approximately 4 wt % fumed silica (d50 of approximately 0.5 microns and SSA of 14 m²/g), such that the total of the contents was 100%. The "Standard Mullite" Sample was formed from approximately 81 wt % electrofused mullite, approximately 15 wt % alumina (d50 of approximately 5 microns), and approximately 4 wt % fumed silica (d50 of approximately 0.5 microns and SSA of 14 m2/g). All other samples included a particular amount of dopant, as identified in Table 1 below, and such content of dopant was substituted for an equal amount of mullite from the sample. Each of the samples was sintered at 1700° C. for 10 hours.

With regard to the data presented in Table 1, it should be noted that emissivity is measured as noted in the description herein. For the room temperature measurements, the measurement was a hemispherical reflection. In the range of wavelengths between 0.4 μm and 2.5 μm, the reflection is measured using a Perking Elmer Lambda 950 spectrometer. In the range of wavelengths between 2 μm and 25 μm, the reflectivity is measured using a FTIR spectrometer. Radiation is received perpendicularly to the surface of the sample (i.e., normal incidence), and the reflected signal is measured via an integrating sphere (i.e., hemispherical reflection). The opening of the spheres in both spectrometers has a diameter of 20 mm. The sample is placed on the opening for reflection measurement (respectively transmission measurement if needed) and the sample need to be larger than the opening. Reflectivity is the ratio of the recorded signal by the incident signal. Emissivity is derived by the formula: Emissivity=1−Reflectivity. The sample is thick enough to avoid transmission. If needed, the diffuse transmissivity can also be measured in the spectrometer with the integrating sphere. In case the transmitted signal is not negligible, the emissivity is derived by the formula: Emissivity=1−Reflectivity−Transmissivity.

For the high temperature measurements, the sample is heated with a high power CO2 laser, and the emission of a heated sample is measured in the direction perpendicular to the surface (i.e., normal emissivity). The average emissivity for the samples was calculated over the wavelength range, without weighting factor. The blackbody average was a weighted average along the wavelength range with the Planck function. Planck function gives spectral blackbody emission (i.e., an emission of a surface with emissivity of 1) with at a given wavelength and a given temperature. The Planck function at 1600° C. is given by the following function $$L_\lambda(T) = \frac{2hc^2}{\lambda^5} \frac{1}{\exp\left(\frac{hc}{\lambda K_B T}\right) - 1}$$

Notably, the variables in the above equation include $h=6.62 \cdot 10^{-34}$ J·s, which is Planck's constant, $c=2.99 \cdot 10^8$ m·s$^{-1}$, which is the velocity of light velocity in a vacuum, $K_B=1.38 \cdot 10^{-23}$ m²·kg·s$^{-2}$·K$^{-1}$ is the Boltzmann constant and $\lambda$ is the wavelength in m, and T is the temperature in Kelvin. Wavenumber in cm$^{-1}$ is the inverse of wavelength.

TABLE 1

| dopant in Mullite | Dopant Fraction x % mass | RT measurement (hemispherical refl.) BlackBody average 1600° C. | HT measurement (normal emission) BlackBody average 1600° C. | RT measurement Average 4000 cm-1~14000 cm-1 | 1600° C. measurement Average 4000 cm-1~14000 cm-1 |
|---|---|---|---|---|---|
| Standard Mullite | — | 0.13 | 0.14 | 0.13 | 0.13 |
| NiFe2O4 | 10.0% | 0.90 | | 0.90 | |
| NiFe2O4 | 5.0% | 0.86 | | 0.86 | |
| NiFe2O4 | 2.5% | 0.78 | | 0.78 | |
| Fe3O4 | 10.0% | 0.90 | | 0.89 | |
| Fe3O4 | 5.0% | 0.90 | | 0.89 | |
| Fe3O4 | 2.5% | 0.76 | | 0.74 | |
| Fe2O3 | 10.0% | 0.90 | | 0.90 | |
| Fe2O3 | 0.5% | | 0.25 | | 0.28 |
| (MgAl2O4)$_{50\% mol}$, (Fe3O4)$_{50\% mol}$ | 5% | 0.90 | | 0.90 | |
| La2O3 | 0.5% | | 0.14 | | 0.15 |
| LaCrO3 | 10.0% | 0.26 | | 0.26 | |
| Cr2O3 | 10.0% | 0.20 | | 0.17 | |
| Cr2O3 | 0.5% | | 0.26 | | 0.41 |
| MnO2 | 10.0% | 0.49 | | 0.48 | |
| CeO2 | 10.0% | 0.24 | | 0.25 | |
| NiO | 10.0% | 0.81 | | 0.85 | |
| SnO2 | 10.0% | 0.21 | | 0.21 | |
| TiO2 | 0.5% | | 0.21 | | 0.25 |
| ZrB2 | 10.0% | 0.24 | | 0.26 | |

Table 2 below provides some melting points of the materials made from the batch of samples of Example 1 noted above in Table 1. The melting temperatures provide further indication of the refractory capabilities of the samples.

TABLE 2

| Dopant in Mullite | Fraction × % mass | Melting Temperature |
|---|---|---|
| NiFe2O4 | 10.0% | 1850° C. but NIS |
| Fe3O4 | 10.0% | 1595° C. |
| Fe2O3 | 10.0% | 1350° C. |
| $(MgAl_2O_4)_{50\% \, mol}$, $(Fe_3O_4)_{50\% \, mol}$ | 5% | 1600° C. |
| LaCrO3 | 10.0% | 2450° C. |
| Cr2O3 | 10.0% | ~2300° C. |
| MnO2 | 10.0% | 1347° C. |
| CeO2 | 10.0% | 2400° C. |
| NiO | 10.0% | 1957° C. but NIS |
| SnO2 | 10.0% | 1625° C. but vol. |
| ZrB2 | 10.0% | 3000° C. |

Figure 2:
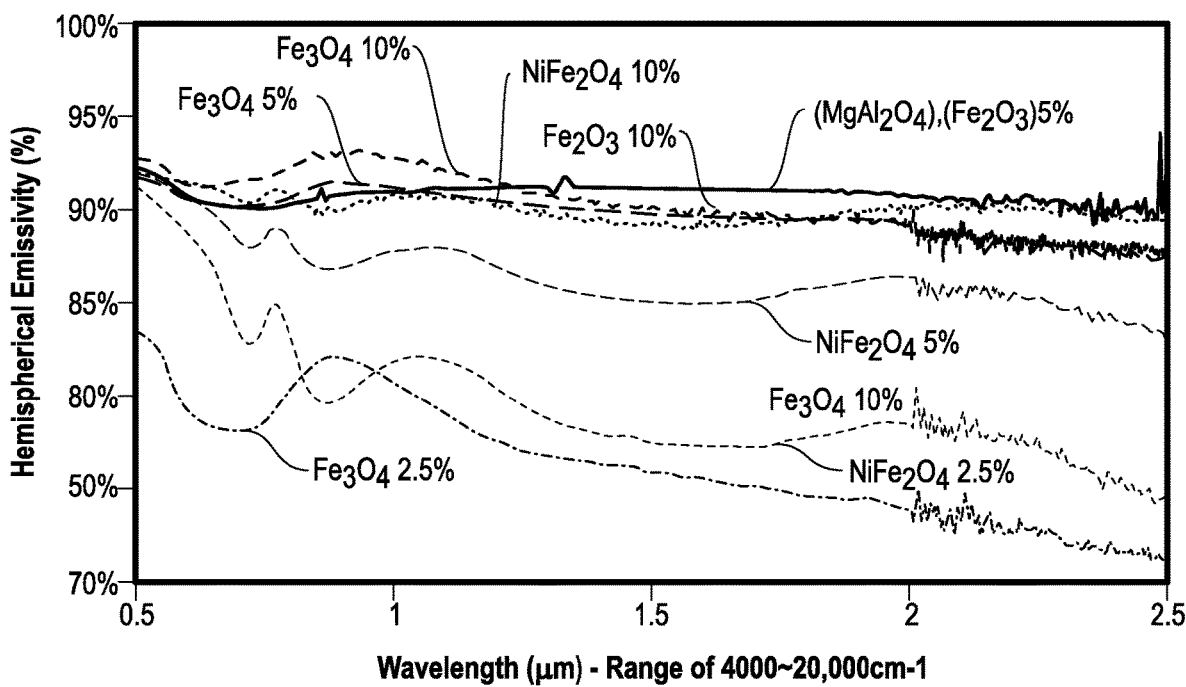
FIG. 2 includes emissivity of certain samples according to embodiments.

FIGS. 1 and 2 provide plots of emissivity versus wavelength for certain samples of Example 1. Notably, the samples containing $Fe_2O_3$ (10%), $Fe_3O_4$ (10%), $NiFeO_4$ (10%), and $(MgAl_2O_4)$, $(Fe_2O_3)$ (5%) demonstrated the highest average emissivity of the samples tested. FIG. 2 further demonstrates the impact of the dopants on the emissivity for certain samples doped with iron-containing dopants. Notably, the sample with only 5% of $(MgAl_2O_4)$, $(Fe_2O_3)$ performed as well as the other samples having twice the content of iron-containing dopants.

It should be noted that the sample containing 5% $(MgAl_2O_4)$, $(Fe_2O_3)$ was formed according to the following process. The powder was synthesized by presintering by mixing 50% mol of spinel powder $(MgAl_2O_4)$ and 50% mol of $Fe_3O_4$ powder. The powders were supplied by Alfa Aesar. The mixture was made into pellets by uniaxial pressing and then sintered at a temperature between 1500° C. and 1650° C. The pellets were then crushed to 325 mesh size. This powder was then added as an additive in the mullite formulation at 5 wt %.

Example 2

Figure 3:
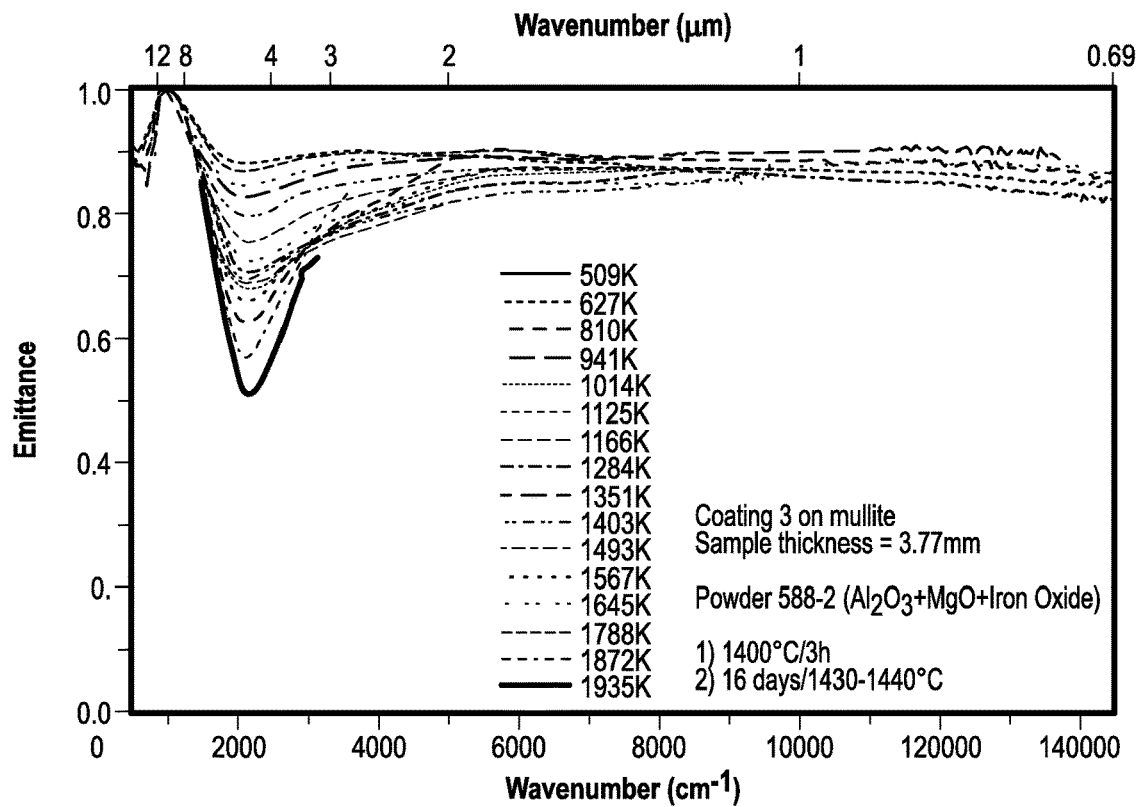
FIG. 3 includes an emissivity spectra for a sample according to an embodiment.

Two new samples representing a composite body including a core and coating were formed. The first sample was created by first electrofusion of a mixture of 42.3 wt % alumina, 27.0 wt % magnesium, and 30.6 wt % $Fe_2O_3$ powder. The fused cast material was then crushed into powder with grain size below 325 mesh size. The sieved powder was then placed in a liquid carrier to create a slurry that was sprayed onto a block of mullite. The coating had a thickness of approximately of 100-300 microns. FIG. 3 includes an emission spectra for the first sample.

Figure 4:
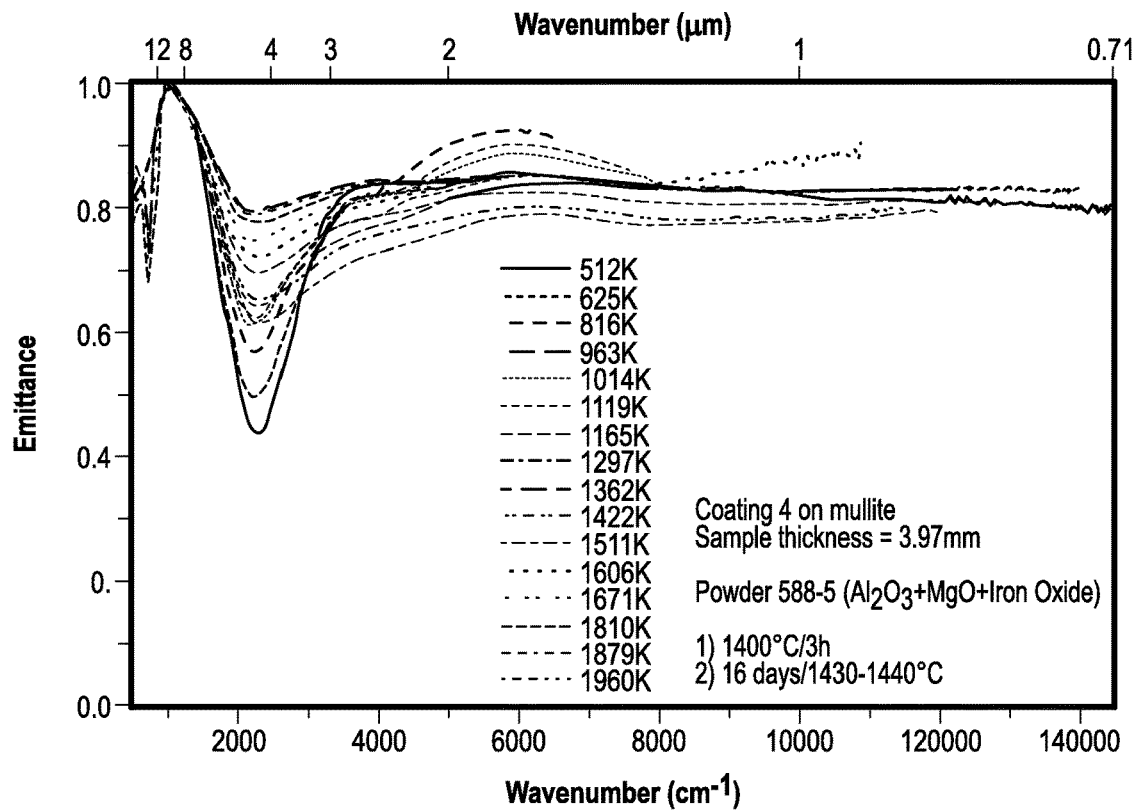
FIG. 4 includes an emissivity spectra for a sample according to an embodiment.

A second sample was formed by electrofusion of a mixture of 59.7 wt % alumina, 31.3 wt % magnesium, and 11.9 wt % $Fe_2O_3$ powder. The fused cast material was then crushed into powder with grain size below 325 mesh size. The sieved powder was then placed in a liquid carrier to create a slurry that was sprayed onto a block of mullite. The coating had a thickness of approximately of 100-300 microns. FIG. 4 includes an emission spectra for the second sample.

Samples 1 and 2 were then tested according to the conditions noted above. In particular, the emissivity was measured using two Fourier transform infrared (FTIR) spectrometers manufactured by Bruker (Vertex Vertex 80v and 70) for performing emission measurements in the spectral range of 1000-16000 $cm^{-1}$. The samples had a thickness of about 4 mm and the typical diameter of the analyzed area on the sample was 2 mm. The sample was heated by a $CO_2$ laser (Diamond K500, Coherent INC.). The beam followed a path through a splitter and a set of mirrors for conducting heating of the two faces of the sample. Two radiation heat fluxes were simultaneously measured by both spectrometers: the flux emitted by the sample and the flux emitted by a black body. The black body was a Pyrox PY8 furnace, having a cylindrical cavity in lanthanum chromite $LaCrO_3$, pierced with a lateral orifice, and having an emissivity equal to 1. The emission of the heated sample was measured in the direction perpendicular to the surface (i.e., normal emissivity). The infrared spectrometers were also used as pyrometers for the measurement of the sample temperature. The method used was that from the point of Christiansen. The emission spectra for the first and second samples is shown in FIGS. 3 and 4 respectively. As noted, the emission spectra for both samples over the range of wavelengths and temperatures measured is suitable for use in refractory operations.

Notably, both samples demonstrated suitable performance and broad-band emissivity over the temperature range of interest.

It will be appreciated that reference herein to any materials of the articles of the embodiments includes forming the article essentially from any of the materials mentioned. Moreover, it will be appreciated that the foregoing description also contemplates that any of the articles of the embodiments herein may be essentially free of any materials that are described as well as those materials that are not described with any of the articles.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

The invention claimed is:
1. A refractory article comprising:
    a body including a ceramic consisting of:
        mullite present in an amount of at least 93 wt % and not greater than 97 wt % for a total weight of the body; and
        a dopant consisting of a combination of $MgAl_2O_4$ and $Fe_3O_4$, wherein the dopant is present in an amount of at least 3 wt. % and not greater than 7 wt. % for a total weight of the body,
        wherein the body comprises an average relative emissivity over a wavelength of 0.5 microns to 5 microns of at least 0.8 and not greater than 0.99, and wherein the body comprises a melting temperature of at least 1600° C. and not greater than 3200° C.

2. The refractory article of claim 1, wherein the ceramic is in the form of a monolithic body including the mullite and the dopant.

3. The refractory article of claim 1, wherein the body is a composite including a core and the ceramic as a coating overlying the core.

4. The refractory article of claim 3, wherein the core and the coating comprise at least one element that is the same.

5. The refractory article of claim 3, wherein the core and the coating comprise mullite.

6. The refractory article of claim 3, wherein the core comprises an oxide.

* * * * *